United States Patent [19]
Rosenthal et al.

[11] 3,891,748
[45] June 24, 1975

[54] CONTINUOUS PROCESS FOR PRODUCTION OF HYDROGEN PEROXIDE

[75] Inventors: Rudolph Rosenthal, Broomall; Joseph A. Kieras, Lincoln University, both of Pa.

[73] Assignee: Atlantic Richfield Company, Philadelphia, Pa.

[22] Filed: June 18, 1973

[21] Appl. No.: 370,902

[52] U.S. Cl. ............................................... 423/587
[51] Int. Cl. .......................................... C01b 15/02
[58] Field of Search .................. 423/587; 260/610 R

[56] References Cited
UNITED STATES PATENTS
2,092,322 9/1937 Moser ............................ 260/610 R
3,737,518 6/1973 Bonetti et al. ...................... 423/587

*Primary Examiner*—Oscar R. Vertiz
*Assistant Examiner*—Wayne A. Langel
*Attorney, Agent, or Firm*—Delbert E. McCaslin

[57] ABSTRACT

Continuous process for the production of hydrogen peroxide by the acid catalyzed hydrolysis of tertiary butyl hydroperoxide preferably in the form of an isobutane oxidate comprised predominantly of tertiary butyl hydroperoxide and tertiary butyl alcohol wherein the tertiary butyl alcohol fed with the tertiary butyl hydroperoxide as well as the tertiary butyl alcohol produced in the hydrolysis reaction is continuously removed from the reaction zone. This method not only provides the economies of a continuous process but also utilizes a cheap and commerically available feed stock and minimizes the usual side-reactions associated with acid catalyzed hydrolysis such as the reactions of tertiary butyl alcohol with hydrogen peroxide or with tertiary butyl hydroperoxide to form di-tertiary butyl peroxide.

7 Claims, No Drawings

CONTINUOUS PROCESS FOR PRODUCTION OF HYDROGEN PEROXIDE

BACKGROUND OF THE INVENTION

Acid catalyzed hydrolysis of organic hydroperoxides to produce hydrogen peroxide has been described heretofore. One of the most recent patents in this art is U.S. Pat. No. 3,737,518 (1973) which shows a method of producing one mole of hydrogen peroxide and one mole of alcohol by reacting one mole of an organic hydroperoxide and one mole of water at a temperature of from 60° C. to 130° C. in an aqueous acid solution containing from 1 to 40 weight per cent acid based on the acid and water with the organic hydroperoxide being introduced into the reaction zone in an amount of from about one to about 50 per cent by weight based on the aqueous solution containing the acid, water and organic hydroperoxide reactants.

The preferred organic hydroperoxides in this patented process are ethylbenzene hydroperoxide, cumene hydroperoxide, cyclohexane hydroperoxide, tertiary butyl hydroperoxide and tertiary amyl hydroperoxide. The preferred acids are sulfuric, phosphoric, hydrochloric, p-toluene sulfonic, potassium acid sulfate and boron phosphate.

In the present invention the reactants are aqueous sulfuric acid, preferably, and also preferably isobutane oxidate which is comprised of a mixture of tertiary butyl hydroperoxide and tertiary butyl alcohol with the reaction being carried out in a continuous manner with continuous removal of the alcohol from the reaction zone.

SUMMARY OF THE INVENTION

In accordance with the instant invention an aqueous acid solution such as aqueous sulfuric acid is introduced into an upper inlet of a fractionating column type reactor and tertiary butyl hydroperoxide preferably in the form of an isobutane oxidate is introduced into a lower inlet of the fractionating column provided with a heated pot below the column and condensing and receiving means connected to the top of the fractionating column. Temperatures ranging from 85° C. to 110° C. can be employed to carry out the reaction. A mixture of unreacted tertiary butyl hydroperoxide, tertiary butyl alcohol, water and any volatile reaction products are taken overhead to the receiver and the hydrogen peroxide product, along with some tertiary butyl hydroperoxide and aqueous acid drops into the pot below the column.

It is an object of this invention, therefore, to provide a method for the continuous acid catalyzed hydrolysis of tertiary butyl hydroperoxide to produce hydrogen peroxide.

It is another object of this invention to provide a method for the continuous acid catalyzed hydrolysis of tertiary butyl hydroperoxide to hydrogen peroxide while continuously removing the tertiary butyl alcohol as formed in the reaction.

It is another object of this invention to provide a method for the continuous production of hydrogen peroxide by the acid catalyzed hydrolysis of tertiary butyl hydroperoxide which minimizes the side reactions of the tertiary butyl alcohol with the hydrogen peroxide and the tertiary butyl hydroperoxide.

It is another object of this invention to provide a method for the production of hydrogen peroxide from an isobutane oxidate charge material.

Other objects of this invention will be apparent from the description of the invention which follows and from the claims.

DESCRIPTION OF THE INVENTION

The feed can, of course, be pure tertiary butyl hydroperoxide, but the method of this invention permits the use of the commercially available isobutane oxidate which comprises tertiary butyl hydroperoxide admixed with tertiary butyl alcohol.

Commercially, isobutane is thermally oxidized in the liquid phase at a temperature conveniently in the range of from 200° F. to 300° F. under pressures of 300 psig to 700 psig utilizing molecular oxygen which can be in the form of air, but generally is essentially pure oxygen. The isobutane is preferably pure, however, small amounts of other hydrocarbons such as benzene or lower paraffins can be tolerated. This commercial process is well known to the art being described in U.S. Pat. No. 2,845,461 (1958) to Winkler et al with an improved method described in U.S. Pat. No. 3,478,108 (1969) to Grane, wherein selectivity to the hydroperoxide is increased.

Depending upon the conversion and reaction parameters employed the ratio of the two predominant products (which comprise 90 to 95 mole per cent), i.e., tertiary butyl hydroperoxide and tertiary butyl alcohol, can be varied over a relatively wide range. Most commonly the tertiary butyl hydroperoxide will range from about 50 weight per cent of the oxidate product up to 70 weight per cent with the remainder being predominantly tertiary butyl alcohol and minor amounts generally 1 per cent or less each of other oxidation products such as water, methanol, lower molecular weight acids, esters and ketones. This crude oxidate product can be used as feed for the instant process or the tertiary butyl hydroperoxide can be purified by conventional means, however, it is preferred to use the crude oxidate since it is a cheap source of the starting material, tertiary butyl hydroperoxide. The amount of tertiary butyl hydroperoxide can range from 1 weight per cent to 50 weight per cent based on the total weight of the entire feed to the reaction zone, i.e., the oxidate (or tertiary butyl hydroperoxide if used in pure form), water and acid. Higher concentrations are not preferred since even by the method of this invention such concentrations promote by-product formation of di-tertiary butyl peroxide to an undesirable extent.

The acids employed as catalysts can be any of those disclosed in the aforementioned patent, U.S. Pat. No. 3,737,518, however, the most preferred is sulfuric acid. Concentrations can range from 1 weight per cent to 40 weight per cent based on acid and water. It will be noted that although the hydrolysis reaction involves reacting one mole of the hydroperoxide with one mole of water to produce one mole of hydrogen peroxide and one mole of the alcohol, it is not critical that there be an exact one to one mole ratio of hydroperoxide to water since excess water is simply removed, generally overhead, while the tertiary butyl hydroperoxide is recovered and recycled. Likewise as will be discussed the aqueous acid can be recycled.

It is known in the art to employ phosphate type stabilizers to prevent decomposition and pick up metal contaminants. The use of a stabilizer is optional in the instant process and if one is desired suitable examples are sodium pyrophosphate and potassium pyrophosphate. Likewise the concentration of stabilizer is optional with amounts ranging from 1 weight per cent to 5 weight per cent based on the reactants being satisfactory but larger or smaller amounts also can be used or none as desired.

Although various types of equipment can be employed in the method of this invention a convenient and preferred mode involves introducing tertiary butyl hydroperoxide alone or in admixture with tertiary butyl alcohol as in the described isobutane oxidate into a lower inlet of a heated fractionating column of conventional design, for example, a glass helicespacked heated column. The aqueous sulfuric acid solution of the desired concentration is fed into an inlet positioned above the hydroperoxide feed inlet. A conventional overhead line at the top of the column to a condenser and receiver are provided while a heated pot or reboiler system is provided at the bottom of the column.

A mixture of unconverted tertiary butyl hydroperoxide and water together with the tertiary butyl alcohol fed along with the tertiary butyl hydroperoxide (if isobutane oxidate is the feed) and the tertiary butyl alcohol formed in the reaction are removed continuously from the top of the column and condensed into the receiver. If the amount of tertiary butyl hydroperoxide removed overhead is sufficient to warrant its recovery this can be done by conventional means and it can be recycled.

The hydrogen peroxide produced along with the remaining unconverted tertiary butyl hydroperoxide and aqueous sulfuric acid drops into the pot or reboiler zone from which the solution can be sent to a purification zone for recovery of the hydrogen peroxide. This can be accomplished, either by direct vacuum distillation of the aqueous solution and the sulfuric acid recycled to the reaction zone or the product can first be neutralized prior to distillation.

Since tertiary butyl alcohol boils at about 83° C., in order to insure its complete removal a minimum reaction temperature in the column should be about 85° C. and preferably 90° C. Temperatures above 110° C. should be avoided in order to minimize the overhead distillation of the water and tertiary butyl hydroperoxide before they have had time to react and also minimize by-product formation. The preferred upper temperature is 100° C.

Since the reaction occurs to the largest extent in the fractionating column, although some may occur in the pot or reboiler zone, it is necessary to have sufficient "hold-up" time in the column to permit the reaction to occur. In general a hold up time of 3 to 5 minutes minimum ranging up to 30 minutes or more should be employed although the time is somewhat temperature dependent. Likewise the degree of contacting in the fractionating column is another parameter, however, in general the column should be designed and operated to provide rapid removal of the tertiary butyl alcohol while allowing sufficient contact time to hydrolyze the hydroperoxide to produce the desired hydrogen peroxide product.

It is preferred to use atmospheric pressure although sub- or super-atmospheric pressures could be used by proper temperature adjustments.

In the first two Examples which follow the adverse effects of tertiary butyl alcohol on the selectivity to hydrogen peroxide in batch processes are demonstrated. Example III demonstrates the improvements in selectivity by continuous reaction in a fractionating column in accordance with this invention while Example IV demonstrates the need for the continuous contacting which is obtained in a column.

EXAMPLE I

An aqueous solution containing 5 weight per cent t-butyl hydroperoxide and 7 weight per cent sulfuric acid was heated at 95° C. for one hour. The conversion of the t-butyl hydroperoxide was 44 weight per cent, and the selectivity to hydrogen peroxide, based on the t-butyl hydroperoxide converted, was 41 mole per cent.

EXAMPLE II

A solution similar to that of Example I, except that it also contained 5 weight per cent t-butanol, was heated at 95° C. for one hour. The conversion of t-butyl hydroperoxide was 70 weight per cent, but the selectivity to hydrogen peroxide was only 10 mole per cent.

EXAMPLE III

A 24 inch × 1 inch glass helices-packed electrically heated column with two feed inlets, located at 9 inches and 10 inches from the bottom of the column, was attached to an oil-bath heated pot and to a condenser and receiver. A mixture of 30 g water, 2.5 g sulfuric acid and 0.2 g sodium pyrophosphate was charged to the pot and heated to 98°–100° C. To the lower inlet was fed 29.5 ml of a 49.8 weight per cent t-butyl hydroperoxide solution in t-butanol over a period of four hours. During the same period, 28.8 ml of a sulfuric acid solution, of the same composition as that initially charged to the pot, was fed to the upper inlet. The column temperatures varied from about 89° C. at the top of the column, to about 99° C. at the lower portion of the column. Analysis of the overhead, pot and material remaining in the column, showed that 31 weight per cent of the t-butyl hydroperoxide was consumed and the selectivity to hydrogen peroxide was 61 mole per cent. In continuous operation, the pot material could be recycled to the column in place of fresh acid solution to increase the concentration of hydrogen peroxide ultimately obtained.

EXAMPLE IV

A reaction similar to that of Example III was carried out, except that no column was used, the materials being fed directly to the reaction pot. Analysis of the products showed a 32 weight per cent conversion of t-butyl hydroperoxide and a 24 mole per cent selectivity to hydrogen peroxide.

Runs III and IV show that a 2.5 fold increase in selectivity to hydrogen peroxide can be achieved by operation under the conditions of the instant invention.

Hydrogen peroxide is a valuable article of commerce and since tertiary butyl hydroperoxide can now be produced at a low cost it not only is upgraded but the by-product, tertiary butyl alcohol is also valuable as a non-polluting gasoline additive to prevent carburetor icing and provide octane increase. Sulfuric acid is, of course, also cheap and can be largely recycled.

We claim:

1. In a process for the production of hydrogen peroxide by the acid catalyzed hydrolysis of tertiary butyl hydroperoxide, the improvement which comprises continuously contacting said tertiary butyl hydroperoxide with water in the presence of an acid in a contacting zone maintained at a temperature in the range of from 85°C. to 110°C. while separately and continuously removing as overhead from said contacting zone the tertiary butyl alcohol formed during said hydrolysis reaction and recovering the hydrogen peroxide product as bottoms.

2. The method according to claim 1 wherein said hydrolysis is catalyzed by sulfuric acid, said sulfuric acid concentration being in the range of from 1 weight per cent to 40 weight per cent based on acid and water.

3. The method according to claim 2 wherein said tertiary butyl hydroperoxide is in the range of from 1 weight per cent to 50 weight per cent based on the weight of said hydroperoxide, water and acid.

4. The method according to claim 2, wherein said tertiary butyl hydroperoxide is contained in admixture with tertiary butyl alcohol in a crude isobutane oxidate and said tertiary butyl hydroperoxide is in the range of from 1 weight per cent to 50 weight per cent based on the weight of said oxidate, water and acid.

5. The method according to claim 1 wherein said tertiary butyl hydroperoxide is contained in admixture with tertiary butyl alcohol in a crude isobutane oxidate and both the tertiary butyl alcohol formed during said hydrolysis reaction and said tertiary butyl alcohol introduced with said tertiary butyl hydroperoxide feed are continuously removed from said contacting zone as formed and introduced, respectively.

6. The method according to claim 1 wherein said temperature is in the range of from 90° C. to 100° C.

7. The method according to claim 5 wherein said temperature is in the range of from 90° C. to 100° C.

* * * * *